(12) United States Patent
Guo

(10) Patent No.: US 8,428,066 B2
(45) Date of Patent: Apr. 23, 2013

(54) METHOD AND APPARATUS FOR REPORTING CARRIER STATUS

(75) Inventor: Yu-Hsuan Guo, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 271 days.

(21) Appl. No.: 12/787,401

(22) Filed: May 26, 2010

(65) Prior Publication Data
US 2010/0302964 A1 Dec. 2, 2010

Related U.S. Application Data

(60) Provisional application No. 61/180,929, filed on May 26, 2009.

(51) Int. Cl.
*H04L 12/28* (2006.01)

(52) U.S. Cl.
USPC .......................... 370/395.2; 455/229

(58) Field of Classification Search .................. 370/252, 370/395.2; 455/229
See application file for complete search history.

(56) References Cited

U.S. PATENT DOCUMENTS

2010/0118720 A1* 5/2010 Gauvreau et al. ............ 370/252
2011/0021154 A1* 1/2011 Marinier et al. ........... 455/67.11

FOREIGN PATENT DOCUMENTS

KR 1020080014027 A 2/2008

OTHER PUBLICATIONS

3GPP TSG-RAN WG2 Meeting #72, Jacksonville, U.S.A., Nov. 15-19, 2010 (R2-106199).
3GPP TSG-RAN WG2 Meeting #72, Jacksonville, U.S.A., Nov. 15-19, 2010 (R2-106214).
3GPF TSG-RAN WG2 #72, Jacksonville, U.S.A., Nov. 15-19, 2010 (R2-106237).
3GPP TSG-RAN WG2 #72, Jacksonville. U.S.A., Nov. 15-19, 2010 (Tdoc R2-106258)
3GPP TSG-RAN WG2 Meeting #72, Jacksonville, U.S.A., Nov. 15-19, 2010 (R2-106325).
3GPP TSG-RAN WG2 #72, Jacksonville, U.S.A., Nov. 15-19, 2010 (R2-106328).
3GPP TSG-RAN WG2 #72, Jacksonville, U.S.A., Nov. 15-19, 2010 (R2-106353).
3GPP TSG-RAN WG2 Meeting #72, Jacksonville, U.S.A., Nov. 15-19, 2010 (R2-106388).
3GPP TSG-RAN WG2 #72, Jacksonville, Florida, Nov. 8-12, 2010 (R2-106417).
3GPP TSG-RAN2 Meeting #72, Jacksonville, U.S.A., Nov. 15-19, 2010 (R2-106495).
3GPP TSG-RAN2#72 Meeting, Jacksonville, U.S.A., Nov. 15-19, 2010 (Tdoc R2-106509).
3GPP TSG-RAN2#72, Jacksonville. U.S.A., Nov. 15-19, 2010 (R2-106542).
3GPP TSG-RAN WG2 Meeting #72, Jacksonville, U.S.A., Nov. 15-19, 2010 (R2-106612).
3GPP TSG-RAN2#72, Jacksonville, U.S.A., Nov. 15-19, 2010 (R2-106665).

(Continued)

*Primary Examiner* — Sai-Ming Chan
(74) *Attorney, Agent, or Firm* — Blue Capital Law Firm, P.C.

(57) ABSTRACT

A method for reporting carrier status in a user equipment (UE) of a wireless communication system is disclosed. The wireless communication system supports Carrier Aggregation (CA) such that the UE is able to perform transmission or reception through multiple component carriers. The method includes steps of configuring a plurality of component carriers, receiving a signaling utilized for activating or deactivating the plurality of component carriers, and using a medium access control control element (MAC CE) to indicate the signaling is successfully received after the signaling is successfully received.

16 Claims, 5 Drawing Sheets

OTHER PUBLICATIONS

3GPP TSG-RAN2 Meeting #72, Jacksonville, U.S.A., Nov. 15-19, 2010 (R2-106917).

e-IPR Claim Table-2010-W50.

Office Action on corresponding foreign patent application (KR 10-2010-0049362) from KIPO issued on Jun. 22, 2011.

Interdigital: "DTX and carrier activation/deactivation for DC-HSUPA", 3GPP TSG-RAN WG2 Meeting #66, R2-093201, May 4-8, 2009, XP050340906, San Francisco, US.

Ericsson: "DRX with Carrier Aggregation in LTE-Advanced", 3GPP TSG-RAN WG2 #66, R2-092959, May 4-8, 2009, pp. 1/3-3/3, XP050340753, San Francisco, USA.

Huawei: "Considerations on carrier activation and deactivation for DC-HSUPA", 3GPP TSG-RAN WG2 Meeting #65bis, R2-092288, Mar. 23-27, 2009, XP050340056, Seoul, Korea.

Huawei: "Dynamic activation and deactivation of secondary carrier for DC-HSUPA", 3GPP TSG-RAN WG2 Meeting #66, R2-093158, May 4-8, 2009, XP050340875, San Francisco, U.S.A.

CMCC: "Discussions on Carrier Aggregation in RAN2", 3GPP TSG-RAN WG2 Meeting #65bis, R2-092411, Mar. 23-Mar. 27, 2009, pp. 1-4, XP050340129, Seoul, Korea.

3GPP TS 36.331 V 8.5.0, E-UTRA Radio Resource Control Protocol specification, Mar. 2009.

3GPP TS 36.211 V 8.6.0, E-UTRA Physical Channels and Modulation, Mar. 2009.

3GPP, R1-092213, WF on RAN1 concept for OTDOA, Ericsson, Alcatel-Lucent, May 9, 2009.

3GPP, R2-092958, Control plane aspects of carrier aggregation, Ericsson, Apr. 28, 2009.

3GPP, R2-093092, Impact of UL CoMP to HARQ operations, Alcatel-Lucent Shanghai Bell, Alcatel-Lucent, Apr. 27, 2009.

* cited by examiner

METHOD AND APPARATUS FOR REPORTING CARRIER STATUS

CROSS REFERENCE TO RELATED APPLICATIONS

This application claims the benefit of U.S. Provisional Application No. 61/180,929, filed on May 26, 2009 and entitled "Method and apparatus for improving timing synchronization and Carrier Aggregation in a wireless communication system", the contents of which are incorporated herein by reference.

BACKGROUND OF THE INVENTION

1. Field of the Invention

The present invention relates to a method and apparatus for reporting carrier status, and more particularly, to a method and apparatus for reporting carrier status in a user equipment of a wireless communication system, so as to reduce waste of radio resources and power consumption of the user equipment, and enhance the system performance.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in base stations (Node Bs) alone rather than in Node Bs and RNC (Radio Network Controller) respectively, so that the system structure becomes simple.

However, to meet future requirements of all kinds of communication services, the 3rd Generation Partnership Project (3GPP) has started to work out a next generation of the LTE system: the LTE Advanced (LTE-A) system. Carrier aggregation (CA), where two or more component carriers are aggregated, is introduced into the LTE-A system in order to support wider transmission bandwidths, e.g. up to 100 MHz and for spectrum aggregation. Using CA, the network of the LTE-A system provides multiple component carriers instead of a single component carrier for a UE, to establish multiple links for simultaneously receiving and transmitting on each component carrier.

At present, the characteristics of CA are quoted as below:

(1) Supporting CA for both contiguous and non-contiguous component carriers.

(2) It is possible to configure a UE to aggregate a different number of component carriers in the uplink (UL) and the downlink (DL), to obtain different bandwidths.

(3) From a UE perspective, there is one transport block and one hybrid-ARQ (HARQ) entity per scheduled component carrier.

In addition, to configure component carriers of the UE, the network outputs radio resource control (RRC) signaling to the UE, e.g. RRC Connection Setup message or RRC Connection Reconfiguration message.

After CA is configured, the UE has to monitor DL component carriers configured and activated by the upper layer, e.g. RRC, so as to obtain scheduling or control information, and perform transmission or reception accordingly. However, in some situations, transmission amounts may be suddenly increased or decreased, and thus, the network needs to activate or deactivate a part of component carriers of the UE. In general, the network uses a medium access control (MAC) control element (CE), to indicate the UE to activate or deactivate specified component carriers. Thus, the network can determine whether the MAC CE is successfully received by the UE according to feedback messages of HARQ. However, if a NACK (non-acknowledgement) to ACK (acknowledgement) error or DTX (discontinuous transmission) to ACK error occurs, the network erroneously determines that the UE has received the MAC CE. In such a situation, if the MAC CE that is not successfully received by the UE is to activate UL component carriers, the UE does not monitor the corresponding physical downlink control channel (PDCCH), and cannot receive transmission grant indicated by the network via PDCCH, causing waste of radio resources. If the MAC CE is to activate DL component carriers, the UE does not monitor the corresponding PDCCH, and cannot receive DL data, causing data lost. Oppositely, if the MAC CE is to deactivate UL or DL component carriers, the UE keeps monitoring PDCCH, causing unnecessary power consumption.

As can be seen, after CA is configured, if the signaling for activating or deactivating carries is not successfully received, waste of radio resources or unnecessary power consumption of the UE is occurred. Therefore, there is a need to enhance reliability of the signaling.

SUMMARY OF THE INVENTION

It is therefore an objective of the present invention to provide a method and apparatus for reporting carrier status in a wireless communication system.

According to the present invention, a method for reporting carrier status in a user equipment (UE) of a wireless communication system is disclosed. The wireless communication system supports Carrier Aggregation (CA) such that the UE is able to perform transmission or reception through multiple component carriers. The method comprises configuring a plurality of component carriers, receiving a signaling utilized for activating or deactivating the plurality of component carriers, and using a medium access control control element (MAC CE) to indicate the signaling is successfully received after the signaling is successfully received.

According to the present invention, a communication device for reporting carrier status in a user equipment (UE) of a wireless communication system is disclosed. The wireless communication system supports Carrier Aggregation (CA) such that the UE is able to perform transmission or reception through multiple component carriers. The communication device comprises a processor for executing a program, and a memory coupled to the processor for storing the program. The program comprises configuring a plurality of component carriers, receiving a signaling utilized for activating or deactivating the plurality of component carriers, and using a medium access control control element (MAC CE) to indicate the signaling is successfully received after the signaling is successfully received.

According to the present invention, a method for reporting carrier status in a user equipment (UE) of a wireless communication system is disclosed. The wireless communication system supports Carrier Aggregation (CA) such that the UE is able to perform transmission or reception through multiple component carriers. The method comprises configuring a plurality of component carriers, and using a medium access control control element (MAC CE) to indicate statuses of the plurality of component carriers.

According to the present invention, a communication device for reporting carrier status in a user equipment (UE) of a wireless communication system is disclosed. The wireless communication system supports Carrier Aggregation (CA) such that the UE is able to perform transmission or reception through multiple component carriers. The communication device comprises a processor for executing a program, and a memory coupled to the processor for storing the program, wherein the program comprises configuring a plurality of component carriers, using a medium access control control element (MAC CE) to indicate statuses of the plurality of component carriers.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
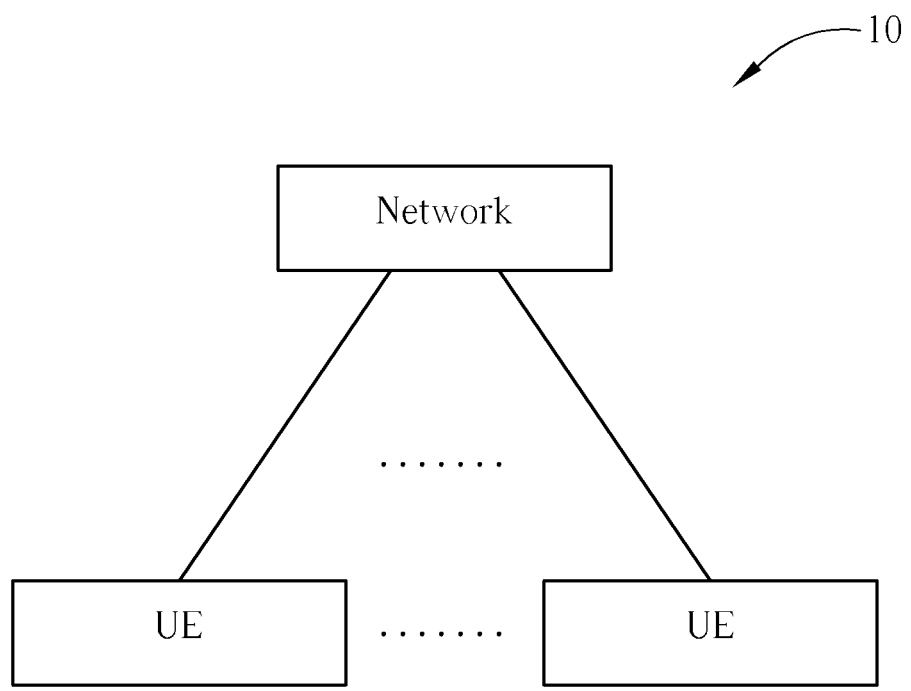
FIG. 1 is a schematic diagram of a wireless communications system.

Please refer to FIG. 1, which illustrates a schematic diagram of a wireless communication system 10. The wireless communication system 10 is preferably an LTE advanced (LTE-A) system, and is briefly composed of a network and a plurality of user equipments (UEs). In FIG. 1, the network and the UEs are simply utilized for illustrating the structure of the wireless communication system 10. Practically, the network may comprise a plurality of base stations (Node Bs), radio network controllers and so on according to actual demands, and the UEs can be devices such as mobile phones, computer systems, etc.

Figure 2:
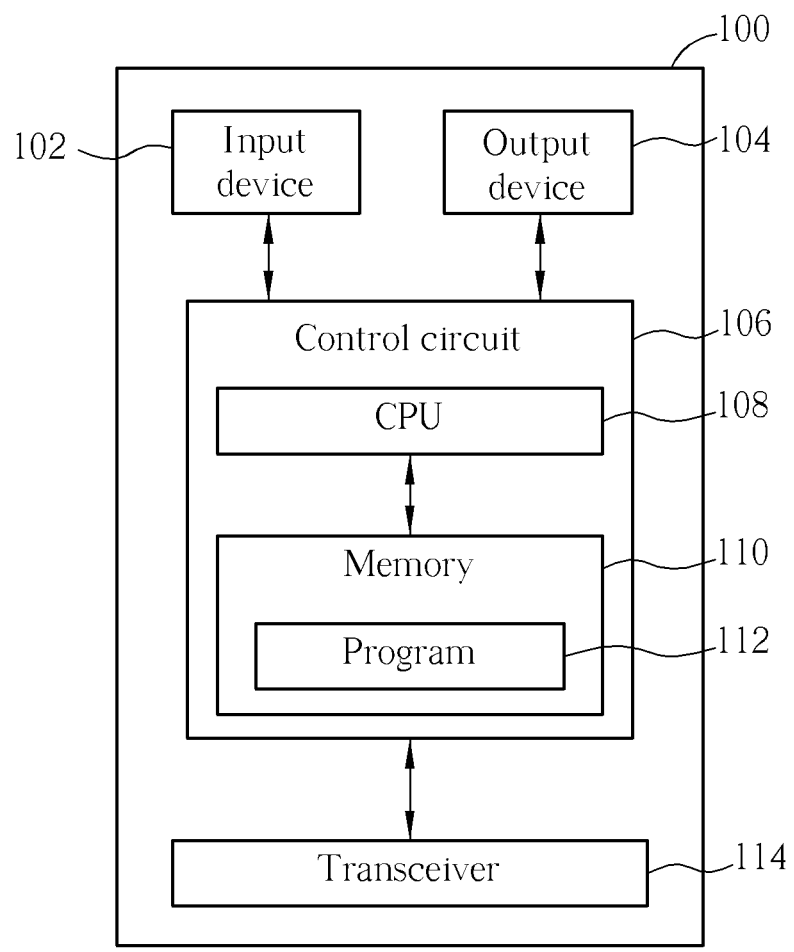
FIG. 2 is a function block diagram of a wireless communications device.

Please refer to FIG. 2, which is a functional block diagram of a communication device 100 in a wireless communication system. The communication device 100 can be utilized for realizing the UEs in FIG. 1. For the sake of brevity, FIG. 2 only shows an input device 102, an output device 104, a control circuit 106, a central processing unit (CPU) 108, a memory 110, a program 112, and a transceiver 114 of the communication device 100. In the communication device 100, the control circuit 106 executes the program 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, deliver received signals to the control circuit 106, and output signals generated by the control circuit 106 wirelessly. From a perspective of a communication protocol framework, the transceiver 114 can be seen as a portion of Layer 1, and the control circuit 106 can be utilized to realize functions of Layer 2 and Layer 3.

Figure 3:
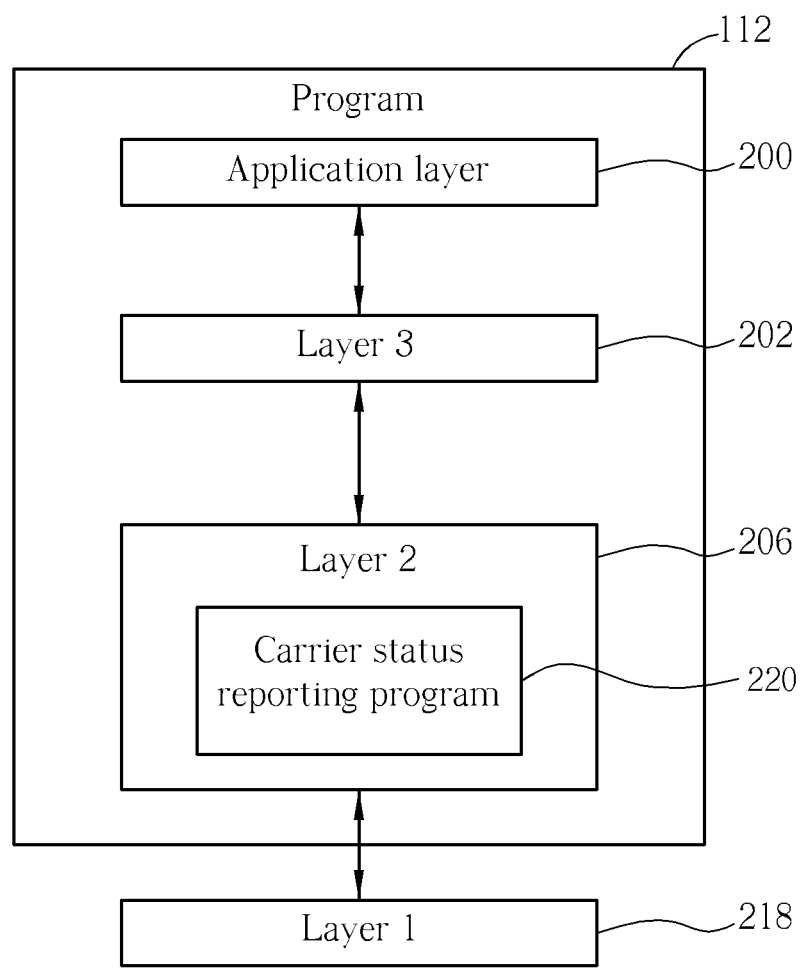
FIG. 3 is a diagram of a program of FIG. 2.

Please continue to refer to FIG. 3. FIG. 3 is a diagram of the program 112 shown in FIG. 2. The program 112 includes an application layer 200, a Layer 3 202, and a Layer 2 206, and is coupled to a Layer 1 218. The Layer 3 202 performs radio resource control. The Layer 2 206 comprises a Radio Link Control (RLC) layer and a Medium Access Control (MAC) layer, and performs link control. The Layer 1 218 performs physical connections.

In LTE-A system, the Layer 1 218 and the Layer 2 206 may support a Carrier Aggregation (CA) technology, which enables the UE to perform transmission or reception through multiple component carriers. In such a situation, the embodiment of the present invention provides a carrier status reporting program 220 for enhancing reliability of signalings used for activating or deactivating component carriers.

Figure 4:
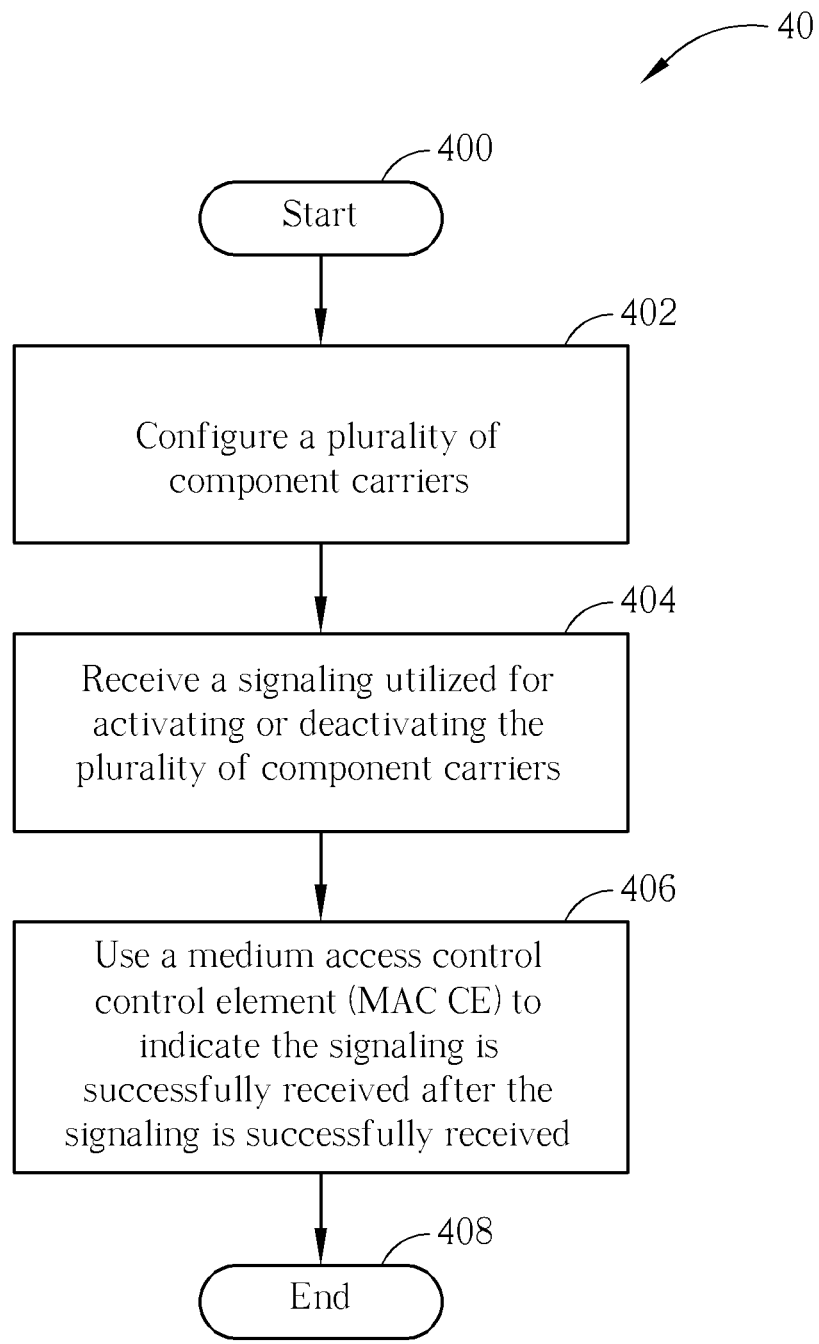
FIG. 4 is a flowchart of a process according to an embodiment of the present invention.

Please refer to FIG. 4, which illustrates a schematic diagram of a process 40. The process 40 is utilized for reporting carrier statuses in a UE of the wireless communication system 10, and can be compiled into the carrier status reporting program 220. The process 40 includes the following steps:

Step 400: Start.

Step 402: Configure a plurality of component carriers.

Step 404: Receive a signaling utilized for activating or deactivating the plurality of component carriers.

Step 406: Use a medium access control control element (MAC CE) to indicate the signaling is successfully received after the signaling is successfully received.

Step 408: End.

According to the process 40, after the CA is configured, if the UE successfully receives a signaling for activating or deactivating component carriers, the UE uses a MAC CE to indicate that the signaling is successfully received. As a result, the network can determine whether the UE accurately activates or deactivates the component carriers, and perform appropriate operations accordingly.

When transmission requirements are changed so that the network needs to activate or deactivate a part of configured component carriers of the UE, the network outputs a MAC CE to indicate the UE to activate or deactivate specified component carriers. In such a situation, according to the embodiment of the present invention, after the UE successfully receives the MAC CE outputted from the network, the UE uses another MAC CE to report that the (former one) MAC CE for activating or deactivating the component carriers has been successfully received. Then, the network can perform appropriate operations accordingly. Oppositely, after the network outputs a MAC CE (for clarity, named MAC CE A) for activating or deactivating component carriers, if the network does not receive another MAC CE (for clarity, named MAC CE B) from the UE for a predefined period of time, the network can determine that the UE does not receive the MAC CE A or the MAC CE B is not successfully transmitted. Thus, the network can further perform appropriate operations to avoid waste of radio resources or unnecessary power consumption of the UE.

Note that, in step 404, the signaling outputted from the network to the UE is not limited to MAC CE. Moreover, the priority of the MAC CE outputted by the UE is preferably higher than that of buffer status report (BSR) MAC CE, and lower than or equal to that of cell radio network temporary identifier (C-RNTI) MAC CE. In addition, the process 40 is applicable for both DL and UL component carriers.

Figure 5:
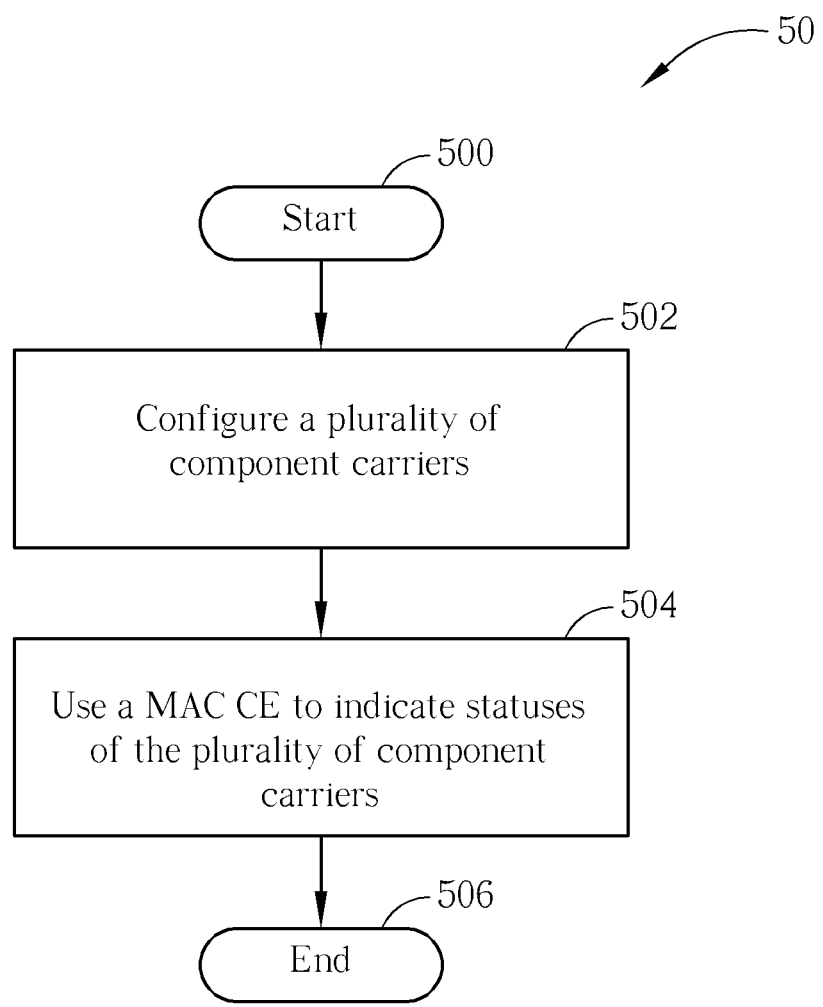
FIG. 5 is a flowchart of a process according to an embodiment of the present invention.

Furthermore, the present invention provides another embodiment for reporting whether the component carriers have been activated or deactivated. Please refer to FIG. 5, which illustrates a schematic diagram of a process 50. The process 50 is utilized for reporting carrier statuses in a UE of the wireless communication system 10, and can be compiled into the carrier status reporting program 220. The process 50 includes the following steps:

Step 500: Start.

Step 502: Configure a plurality of component carriers.

Step 504: Use a MAC CE to indicate statuses of the plurality of component carriers.

Step 506: End.

According to the process 50, after CA is configured, the UE uses a MAC CE to indicate statuses of the configured component carriers, especially to indicate activation or deactivation of each component carrier. As a result, the network can determine the statuses of the component carriers of the UE, and perform appropriate operations accordingly.

Note that, in the embodiment of the present invention, methods and time for the UE to report the carrier status are not limited to any rule, and can be periodic, triggered by predefined events, indicated by the network, and so on. For example, the UE can output the MAC CE to the network once activation of a component carrier is changed, so as to indicate statuses of the configured component carriers. As a result, if the network outputs a MAC CE to indicate the UE to activate or deactivate specified component carriers, after the UE successfully activate or deactivate the specified component carriers, the UE can output another MAC CE to indicate activations or deactivations of the component carriers. In such a situation, the network can determine statuses of the component carriers of the UE, and perform appropriate operations, to avoid waste of radio resources or unnecessary power consumption of the UE.

Moreover, in step 504, the priority of the MAC CE outputted by the UE is preferably higher than that of BSR MAC CE, and lower than or equal to that of C-RNTI MAC CE. And, methods for indicating the carrier status via the MAC CE are not limited to specified rules; for example, a plurality of bits in a bitmap of the MAC CE can be corresponding to the configured component carriers, where bit 0 represents the corresponding component carrier is deactivated, and bit 1 represents the corresponding component carrier is activated. Therefore, if component carriers CC1、CC2、CC3、CC4 are configured for the UE, the component carriers CC1 and CC2 are activated, the component carriers CC3 and CC4 are not activated or are deactivated, then according to the process 50, a MAC CE outputted by the UE can include a bitmap [1100], to represent the carrier status. Accordingly, the network can determine activations and deactivations of the component carriers CC1-CC4, to prevent waste of radio resources or unnecessary power consumption of the UE. In addition, the process 50 is applicable for both DL and UL component carriers.

In the prior art, after CA is configured, if the signaling used for activating or deactivating component carriers is not successfully received, waste of radio resources or unnecessary power consumption of the UE may occur. In comparison, in the present invention, the UE can apply the process 40 to report the signaling is successfully received, or apply the process 50 to inform the network about statuses of the component carriers. As a result, the present invention can prevent the network from wrongly determining statuses of the component carriers of the UE, to ensure effective utilization of radio resources or UE power.

In summary, after CA is configured, via the present invention, the UE can indicate the information of each component carrier to the network, to prevent waste of radio resources or unnecessary power consumption of the UE, and thus, to enhance the system performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for reporting carrier status in a user equipment (UE) of a wireless communication system, the wireless communication system supporting Carrier Aggregation (CA) such that the UE is able to perform transmission or reception through multiple component carriers, the method comprising:
configuring a plurality of component carriers;
receiving a signaling utilized for activating or deactivating the plurality of component carriers; and
using a medium access control control element (MAC CE) to indicate the signaling is successfully received after the signaling is successfully received.

2. The method of claim 1, wherein the signaling is another MAC CE.

3. The method of claim 1, wherein the plurality of component carriers are utilized for uplink transmission.

4. The method of claim 1, wherein the plurality of component carriers are utilized for downlink transmission.

5. A communication device for reporting carrier status in a user equipment (UE) of a wireless communication system, the wireless communication system supporting Carrier Aggregation (CA) such that the UE is able to perform transmission or reception through multiple component carriers, the communication device comprising:
a processor for executing a program; and
a memory coupled to the processor for storing the program;
wherein the program comprises:
configuring a plurality of component carriers; receiving a signaling utilized for activating or deactivating the plurality of component carriers; and
using a medium access control control element (MAC CE) to indicate the signaling is successfully received after the signaling is successfully received.

6. The communication device of claim 5, wherein the signaling is another MAC CE.

7. The communication device of claim 5, wherein the plurality of component carriers are utilized for uplink transmission.

8. The communication device of claim 5, wherein the plurality of component carriers are utilized for downlink transmission.

9. A method for reporting carrier status in a user equipment (UE) of a wireless communication system, the wireless communication system supporting Carrier Aggregation (CA) such that the UE is able to perform transmission or reception through multiple component carriers, the method comprising:
configuring a plurality of component carriers; and
using a medium access control control element (MAC CE) to indicate statuses of the plurality of component carriers, wherein using the MAC CE to indicate the statuses of the plurality of component carriers is using the MAC CE to indicate whether a component carrier of the plurality of component carriers is activated or not.

10. The method of claim 9, the plurality of component carriers are utilized for uplink transmission.

11. The method of claim 9, wherein the plurality of component carriers are utilized for downlink transmission.

12. The method of claim 9, wherein using the MAC CE to indicate the statuses of the plurality of component carriers is using a plurality of bits to indicate the statuses of the plurality of component carriers.

13. A communication device for reporting carrier status in a user equipment (UE) of a wireless communication system, the wireless communication system supporting Carrier Aggregation (CA) such that the UE is able to perform transmission through multiple component carriers, the communication device comprising:

a processor for executing a program; and
a memory coupled to the processor for storing the program;
wherein the program comprises:
configuring a plurality of component carriers;
using a medium access control control element (MAC CE) to indicate statuses of the plurality of component carriers, wherein using the MAC CE to indicate the statuses of the plurality of component carriers in the program is using the MAC CE to indicate whether a component carrier of the plurality of component carriers is activated or not.

14. The communication device of claim 13, wherein the plurality of component carriers are utilized for uplink transmission.

15. The communication device of claim 13, wherein the plurality of component carriers are utilized for downlink transmission.

16. The communication device of claim 13, wherein using the MAC CE to indicate the statuses of the plurality of component carriers in the program is using a plurality of bits to indicate the statuses of the plurality of component carriers.

* * * * *